United States Patent

[11] 3,627,640

| [72] | Inventors | Shmaryahu Blumberg<br>Rishonlezion;<br>Ephraim Katchalski, Rehovot; Leon Goldstein, Rehovot; Yehuda Levin, Tel-Aviv, all of Israel |
|------|-----------|---|
| [21] | Appl. No. | 763,338 |
| [22] | Filed | Sept. 27, 1968 |
| [45] | Patented | Dec. 14, 1971 |
| [73] | Assignees | Yeda Research and Development Co., Ltd.<br>Rehovoth, Israel |

[54] ENZYME PURIFICATION AND DECOLORIZATION
9 Claims, 4 Drawing Figs.

[52] U.S. Cl. .................................................. 195/68, 195/63, 195/DIG. 11
[51] Int. Cl. ...................................................... C07g 7/02
[50] Field of Search ........................................... 195/66, 68, 63 P, 63

[56] References Cited
UNITED STATES PATENTS

| 3,167,485 | 1/1965 | Katchalski et al. | 195/63 |
| 3,208,918 | 9/1965 | Beers, Jr. | 195/66 |
| 3,282,702 | 11/1966 | Schreiner | 195/63 X |
| 3,284,316 | 11/1966 | Cayle | 195/63 |
| 3,483,090 | 12/1969 | Barton | 195/66 |

OTHER REFERENCES

Levin et al., Biochemistry, Vol. 3, No. 12, Dec. 1964, (pages 1905–1912).

Hornby et al., Biochem. J. Vol. 98, 1966, (pages 420–425).

*Primary Examiner*—Lionel M. Shapiro
*Assistant Examiner*—D. M. Naff
*Attorneys*—Gordon W. Hueschen, Hueschen and Kurlandsky and John D. Upham

ABSTRACT: Method of purifying and decoloring a relatively crude enzyme material, e.g., enzyme or enzyme derivative, by forming a polymer-enzyme product.

pH—ESTERASE ACTIVITY PROFILES FOR PAPAIN AND TWO EMA-PAPAIN DERIVATIVES.

O — CRYST. PAPAIN $\Gamma/2 = 0.06$

△, □ — EMA-PAPAIN DERIVATIVES AT $\Gamma/2 = 0.06$

▲, ■ — EMA-PAPAIN DERIVATIVES AT $\Gamma/2 = 1.0$

THE ESTERASE ACTIVITY TOWARDS BAEE, AT pH 6.3, WAS DETERMINED AS DESCRIBED IN THE TEXT.

pH-STABILITY OF NATIVE PAPAIN AT DIFFERENT TEMPERATURES.

○ - pH 3.0   △ - pH 6.0   ● - pH 9
□ - pH 4.5   ■ - pH 7.5

THE ESTERASE ACTIVITY TOWARD BAEE, AT pH 6.3, WAS DETERMINED AS DESCRIBED IN THE TEXT.

pH-STABILITY OF AN EMA-PAPAIN DERIVATIVE (EX.3) AT DIFFERENT TEMPERATURES

○ - pH 3.0   △ - pH 6.0   ● - pH 9
□ - pH 4.5   ■ - pH 7.5

THE ESTERASE ACTIVITY TOWARDS BAEE, AT pH 6.3, WAS DETERMINED AS DESCRIBED IN THE TEXT.

ENZYME PURIFICATION AND DECOLORIZATION

BACKGROUND OF INVENTION

1. Field of Invention

Polymeric enzyme products and their production.

2. The Prior Art

Enzymes and their many uses are well established in the art. Rather recently efforts have been directed toward development of insoluble forms of enzymes which retain the activity of the native enzyme. Insoluble derivatives of various enzymes, including papain, are known. Insoluble papain derivatives have been formed by (a) diazotization coupling of papain to itself using diazobenzidine, (b) diazotization coupling of papain to a collagen carrier, and (c) diazotization coupling of papain to a para-aminophenylalanine-leucine copolymer. (1) Silman Albu-Weissenberg, and Katchalski. Bipolymers 4, 441–448 (1966). (2) Cebra, Givol, Silman, and Katchalski, J. Biol. Chem. 236, 1720 (1961) 25 to item (c). Also, in membrane form by adsorption on collodion and cross linking by diazotization. (3) Goldman, Kedem, Silman, Caplan, and Katchalski, Biochemistry 7, 487 (1968). Of these only (c) involves covalent bonding of the enzyme to a polymeric material. Insoluble trypsin-ethylene maleic anhydride (EMA) products wherein the trypsin is covalently bound without diazotization, have also been reported. (4) Levin, Pecht, Goldstein, and Katchalski, and (5) Goldstein, Levin, and Katchalski. Biochemistry 3, 1905 and 1913 (1964), and (6) Ong, Tsang and Perlmann, J. Biol. Chem. 241, 5661 (1966). Certain enzymes have also been covalently bound to cellulose (Patchornik, U.S. Pat. No. 3,278,392) and item (c) above is the subject of Katchalski and Bar-Eli U.S. Pat. No. 3,167,485. Recently, (7) Manecke and Förster, Makromol. Chem. 91, 136 (1966), reported a nitrated 4-fluorostyrene-methacrylic acid copolymer-papain product having 35 percent of the activity of the native papain. In this polymeric product, the papain was bound by an aromatic nitrogen linkage and free carboxyl groups in the polymer improved wettability but did not participate in the reaction since they were not activated. (8) Manecke and Günzel, Naturw, 54, 531 (1967) prepared a similar polymeric product of papain and an m-isothiocyanatostyrene-acrylic acid copolymer in which the papain was bound by an aromatic isothiourea, carbamate, or thiocarbamate linkage. Again, carboxyl groups were not activated and did not participate in the reaction. Retention of native papain enzymatic activity against amide linkages, but no esteratic or proteolytic activities, was reported. (9) Bernfeld and Wan, Science 142, 678 (1963) entrapped papain on a polyacrylamide gel to obtain a product having only 2–6 percent of the activity of the native papain.

These products as reported have the desired insolubility and relative stability and are enzymatically active, showing that it is possible to covalently bond enzymes to polymers to produce insoluble derivatives without inactivation or loss of their enzymatic activity. This is preferable to adsorption attachment, because the adsorbed material is likely to become detached and present numerous complications such as contamination by reversal of the adsorption process. The advantages of such insoluble products are generally the usual advantages which can be attributed to operation using a relatively stable insoluble material as opposed to a soluble material, i.e., the native soluble enzyme, although the activity of the insoluble material is generally somewhat reduced compared to the native enzyme itself, especially as to proteolytic activity (against high molecular weight substrates) as opposed to esteratic activity (against low molecular weight substrates). This was particularly noticeable with EMA-trypsin, where the proteolytic activity of some products was four to five times lower than that predictable from its esteratic activity. Reference (4). In addition, although a change in activity from that of the native enzyme has been observed in some of these insoluble products (a so-called "pH shift"), the activity-pH curves have paralleled those for the native enzyme, that is, the bound enzyme had about the same range of activity, though perhaps at a different pH, as the native or parent enzyme. Also, temperature activity curves for these products show gradual loss of original activity upon standing and no increase in original enzymatic activity of any significance at any point or under any conditions has heretofore been reported for any insoluble enzyme product.

SUMMARY OF INVENTION

It has now been found that papain/EMA type polymeric products can be prepared without loss of the native enzymatic activity and that they are characterized by unique properties. Also, that preparation of papain-polymeric and related compounds according to usual procedure is difficult and that an improved process, which involves (a) inactivating certain portions of the molecule, as by reaction with a metal, e.g., mercury, (b) reaction of the inactivated enzyme with the polymer to give an enzymatically-inactivated polymeric product, and (c) thereafter resorting the active sites in the enzyme portion of the polymer-enzyme molecule to yield the enzymatically-active polymeric-enzyme product, permits a smoother reaction, greater versatility, and increased yields of desired insoluble product having higher percentages of original native enzyme activity. Moreover, that such an enzyme or inactivated enzyme polymer product can be prepared using relatively crude and highly colored starting enzyme material to give the desired insoluble enzyme-polymer material in substantially colorless form by selective reaction of the polymer with the enzyme in preference to the objectionable contaminating colored impurities.

The provision of processes and products in accord with the foregoing is one of the objects of the invention.

Papain/EMA-type polymeric products of the invention have a high order of proteolytic activity compared with that expected from their esteratic activity, especially in contrast with the known EMA-trypsin; they have a desirable, much narrower and hence more specific activity-pH range than papain itself; and they exhibit the unique stability behavior in dilute suspension at usable concentrations, pH, and temperatures, and increased esteratic values up to 100 percent greater than the initial values even after considerable periods of time. Moreover, they are characterized by a greater specificity of bond-splitting activity as compared with the native papain which adds much to their desirability as useful, controllable enzymatic tools for action upon specific target substrates.

The provision of the unique papain/EMA-type polymeric products is a further object of the invention. Additional objects will become apparent hereinafter and still others will be apparent to one skilled in the art upon reading this specification.

GENERAL DESCRIPTION OF THE INVENTION

Definitions:

"EMA" is a polymer of ethylene and maleic anhydride. Polymers of this type are of great value according to the present invention.

"EMA-papain" or "EMA/papain" is a copolymer of ethylene and maleic anhydride having papain covalently bonded thereto. The product is the same whether the papain is reacted directly with an anhydride group of the ethylenemaleic anhydride copolymer or with a carboxyl group resulting from hydrolysis of an anhydride group of the ethylenemaleic anhydride copolymer, whether or not using an inactivated intermediate form of papain. Anhydride groups not participating in the reaction by which the product is produced in aqueous medium are present in the product as carboxyl or carboxylate groups. Such nonparticipating groups, may, however, be converted to amide, imide, ester, et cetera, groups, as can be present in EMA-type polymers, as hereinafter defined.

"EMA-mercuripapain" is a copolymer of ethylene and maleic anhydride having mercuripapain covalently bonded thereto.

"Water insoluble" means that the product concerned does not dissolve in water or aqueous solutions, although it may have such characteristics as a high degree of swelling due to water solvation, even to the extent of existence in gel form.

"Proteolytic" means protein (large molecule) hydrolyzing capacity, ordinarily as determined by the Kunitz casein digestion procedure.

"Esteratic" means ester (small molecule) hydrolyzing capacity, ordinarily determined against BAEE (benzoylarginine ethyl ester) by the Smith et al. pH-stat method.

Figure 1:
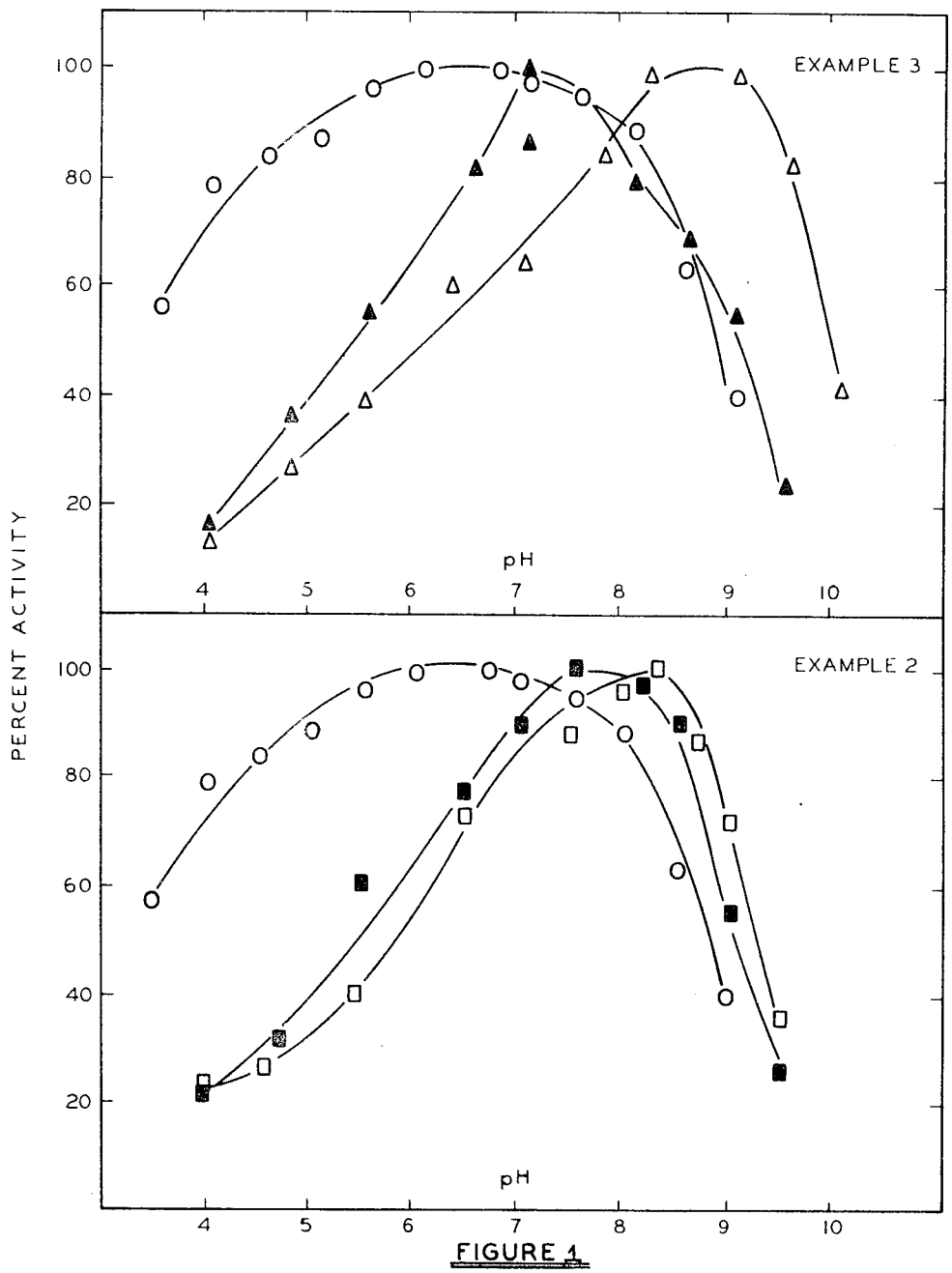
FIG. 1 shows the pH-Esterase activity profile for papain and the relatively much narrower profiles for two EMA-papain derivatives at both low and high ionic strengths.

As previously stated, the insoluble EMA-papain has extremely interesting and valuable properties. That its proteolytic activity is usually at most only 20–40 percent less than predictable from esteratic activity, contrasted with the one-fourth to one-fifth of the proteolytic activity predictable from its esteratic activity reported for EMA-trypsin, is both desirable and unpredictable from previous experience in the EMA-trypsin and earlier work (references cited). In case (c) (reference 1 above), the percent proteolytic activity was less than half that predictable from esteratic activity (30/70). The pH-activity range or profile of EMA-papain is displaced from that of native papain toward more alkaline values (FIG. 1). Even more interesting however, is the fact that it exhibits an extremely narrow optimum activity range when compared with native papain. Such phenomenon has not been observed or reported previously. This characteristic for EMA-papain is in direct contrast to poly(aminophenylalanine-leucine)-papain, in which case the hydrolytic activity of the insoluble product paralleled that of water-soluble papain, having its optimum in the usual broad range of 6–7.5 (ref.2).

The narrow pH range of optimum activity for EMA-papain is, in fact, about 8.3 compared to the broad optimum activity range of pH 6–7 for crystalline papain (FIG. 1). This property, together with a high order of both esteratic and proteolytic activity and a more specific bond-splitting capacity when compared with papain itself, makes the insoluble EMA-papain a unique and highly controllable tool for specific enzymatic processing in a manner not heretofore possible. In such processing, the product may be used in the form of slurries, columns, or the like, in usual procedures and equipment adapted for the treatment of liquids with solids, and may also be used directly for the treatment of solids where desirable as a more stable and specifically active and directable form of the native papain.

Figure 2:
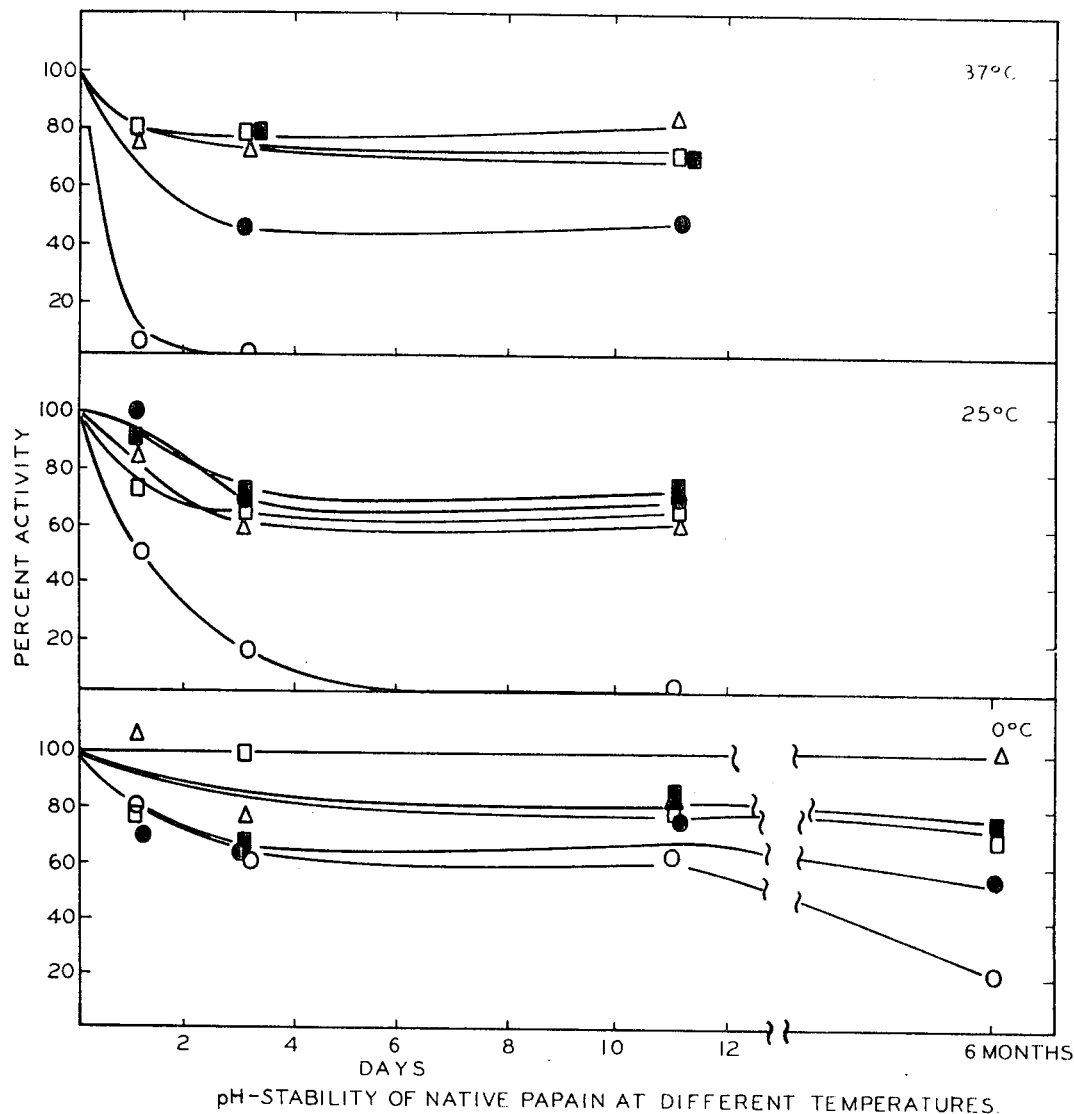
FIG. 2 shows the stability of native papain at different temperatures and different pHs.
Figure 3:
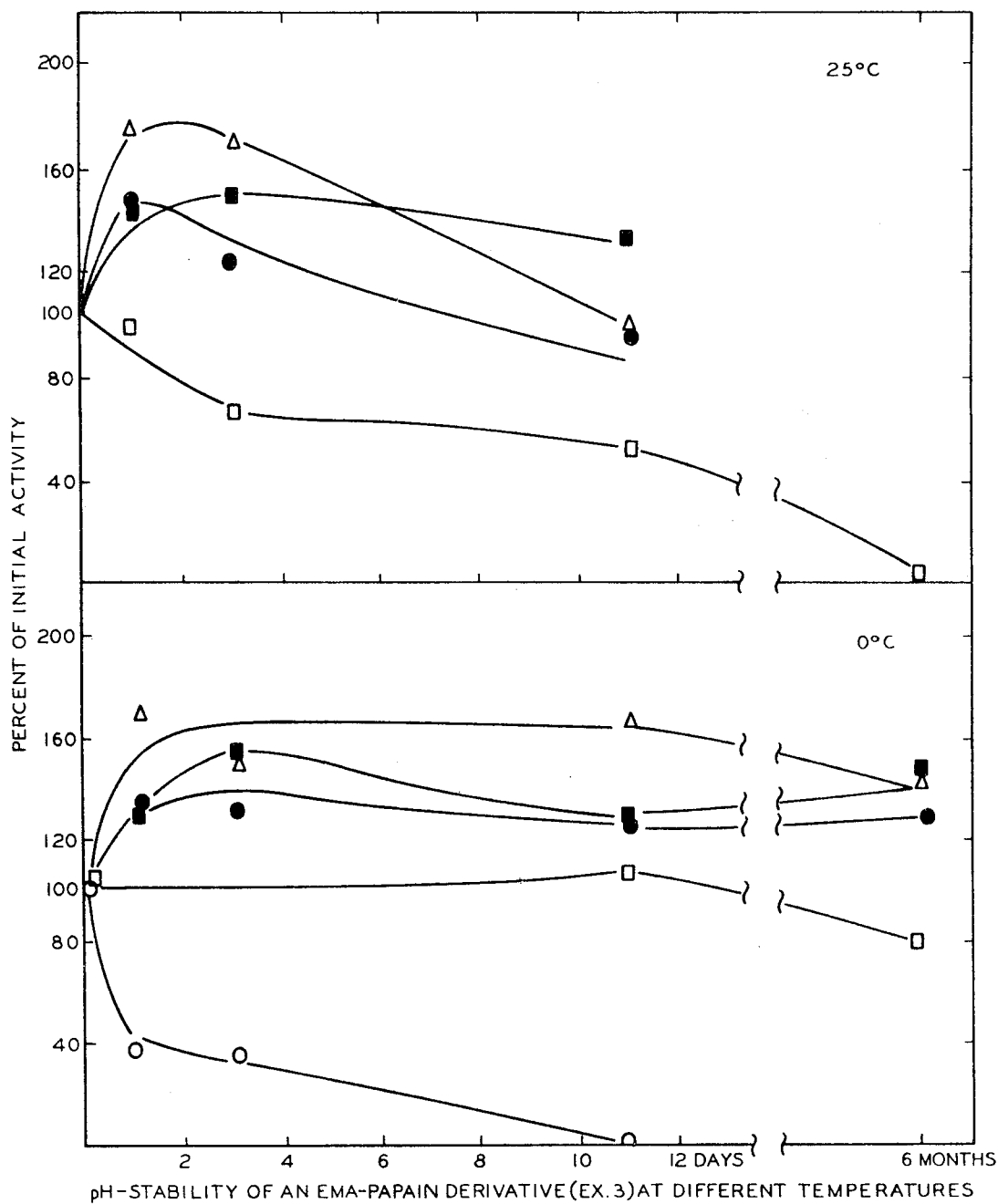
FIG. 3 shows the pH stability curve of an EMA-papain derivative at different temperatures.
Figure 4:
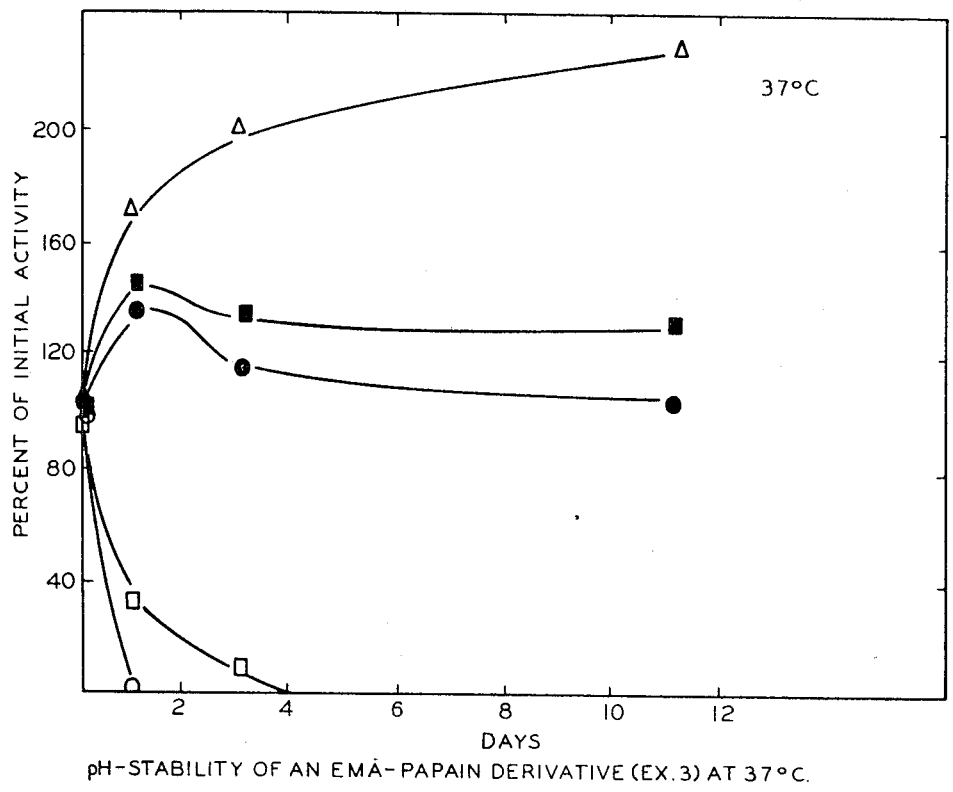
FIG. 4 shows the pH stability curve of an EMA-papain derivative at 37° C.

In addition, possibly because of slow release of enzymatic activity due to a swelling process or some other not understood phenomenon, the insoluble EMA-papain products in dilute suspension at about neutral or slightly alkaline pH ranges and temperatures of 0° to 37° C. actually show an up to 100 percent increase in esteratic activity (FIGS. 3 and 4). Such enhanced activities in dilute suspension of long duration, apparently involving some slow release or exposure of additional enzyme sites over a period of days and even months, can be advantageously exploited in processing applications where such properties are at a premium. FIG. 2 shows the contrasting stability of native papain at different temperatures.

Process

The insoluble polymer-papain derivatives can be prepared by reacting the crystalline or crude enzyme with the polymer in solution, resulting in formation of an insoluble product in which the papain is covalently bound. When an anhydride or carboxyl is present in the polymer, e.g., an EMA-type polymer, covalent bonding of the enzyme to the polymer may be effected directly through reaction or coupling with an anhydride group or with a carboxyl group using an activating agent. The product is the same in both cases. The pH range for the reaction is usually 5 to 9.5, but preferably about 6–8. Isolation and purification is generally effected according to normal biochemical procedures, as exemplified in the prior art cited, and by the general procedure of the examples which follow. Since covalent bonding of the enzyme to the polymer is desired, the reaction is ordinarily carried out at low temperatures and at relatively neutral pH's in water as solvent or in a mixed solvent system, using a solvent in which the enzyme is at least partially soluble. Dimethylsulfoxide (DMSO) has been found especially suitable as solvent and the use thereof in a mixed solvent system constitutes a separate invention.

When carried out in this manner, the results are production of the desired active EMA-papain derivative, but degree of activity imparted to the polymeric product is sometimes low, possibly due to partial inactivation of the enzyme during the process, and the reaction therefore leaves something to be desired from a process standpoint. An improved process was therefore sought and found.

Improved Process

The improved process is generally applicable to the preparation of enzyme-polymeric products wherein an enzyme is to be covalently bonded to the polymer molecule. Inasmuch as the enzymatic activity of the starting enzyme is desired to be retained in the final product, it is of course firstly necessary that the bonding of the enzyme to the polymer be through groups which will not inactivate the active sites in the enzyme molecule. However, when a plurality of reactive groups are present in the enzyme molecule, which are in competition for the reactive groups of the polymer, as in the case of EMA and papain, where not only amino groups but also sulfhydryl groups, among others, can react with the polymer, such competition can and frequently does result in less than optimum activity being imparted to the polymer-enzyme product, due at least partially to competitive reaction between these various reactive groups, including partial inactivation of the end product if the reacting groups constitute a part of the active centers of the enzyme molecule and are necessary for the enzymatic activity, and also because of incidental partial inactivation of activity by destruction of active sites in the enzyme molecule during the course of the reaction by reagent, solvent, or other reaction conditions. Among the various competitively reactive groups of the various enzyme molecules may be mentioned, besides amino and sulfhydryl, also hydroxyl (including phenolic hydroxyl), carboxyl and imidazolyl. Such groups may be present in inactive portions of the enzyme molecule, as in a cysteine, serine, threonine, histidine, or tyrosine moiety of an enzyme molecule, where the particular moiety in question is not considered essential for enzymatic activity, but they frequently are also present in active portions of the same enzyme molecule, in which event the competitive reactions of such groups result in at least some degree of inactivation during attachment to the polymer molecule.

For the foregoing reasons, it has been found advantageous to inactivate, block, or protect one or more of certain groups in the enzyme molecule prior to reaction with the polymer molecule, then conduct the coupling reaction (by which the enzyme moiety is attached to the polymer in its inactivated, blocked, or protected condition) in the manner already described under "Process" for coupling of papain, (Specific conditions employed will of course depend on the stability and reactivity of the enzyme and polymer employed in each particular case.) to produce an enzymatically-inactivated enzyme-polymer product, and thereafter to reactivate or unblock the previously inactivated group or groups in the enzyme moiety to provide the desired enzymatically active polymeric product. One of the simplest inactivating or protecting devices has been found to be formation of a metal derivative of the enzyme, for instance the mercury or zinc derivative of an enzyme having at least one sulfhydryl group, e.g., the mercury derivative of papain. The use of nonoxidizing conditions during formation of such derivatives, as by presence of a mild reducing agent, e.g., cysteine, is advantageous to prevent oxidation of the free sulfhydryl groups in the enzyme during their inactivation. Metal derivatives of other enzymes may also be formed in this manner for inactivation or protection of an active site of the enzyme, e.g., chymopapain, ficin, bromelain, and asclepain, during attachment to the polymer (especially a polymer having carboxyl or anhydride groups) through other groups, which may be of the same type as inactivated, but which are nonessential for activity. Preferably the metal or other enzyme derivative is also soluble in water and aqueous buffer solutions, but it is only essential that the degree of solubility in water or mixed solvents be sufficient to permit the subsequent coupling reaction. Inactivation and protection does not itself depend on solubility factors. Other inactivating or blocking groups may also be used to produce inactivated or blocked enzyme derivatives, such as pyranyl or tetrahydropyranyl ethers, acylates, ketals, enamines, enolethers, esters, and the like, according to known procedures for formation of such groups, and their ultimate removal from the enzyme-polymer molecule to restore the enzymatic activity is also according to mildest possible conditions according to known procedure for removal of these groups in other fields, although it has not heretofore been suggested that such inactivation and removal for reactivation would be possible in the field of this invention. The exact nature of the element or group used for inactivating, protecting, or blocking purposes is immaterial, so long as it performs its desired function of inactivation of active sites or groups and so long as it is removable to restore such active sites or groups after incorporation of the enzyme into the polymer molecule without damage to the product. Moreover, complete inactivation of the enzymatic activity of the enzyme and the intermediate protected enzyme-polymeric product is not essential, and in some cases a substantial amount of enzymatic activity remains in the inactivated enzyme and polymeric inactivated enzyme materials. Zinc papain, for instance, may retain up to 20 percent of the original enzymatic activity, as may the EMA-Zn papain product.

After reaction of this protected, blocked, or inactivated enzyme molecule with the polymer to produce the inactivated polymer-enzyme product, e.g., EMA-mercuripapain, in the usual manner and according to usual procedure, the inactivating element or group is also removed according to conventional biochemical procedures, such as the use of a chelating in the case of a metal inactivating agent. When removal of a metal is involved, this is preferably effected under nonoxidizing conditions so as to prevent oxidation of sulfhydryl groups which are being reactivated. The presence of a mild reducing agent, such as sulfhydryl-containing compound, is advantageous in such case, e.g., cysteine, glutathione, methyl mercaptan, thioglycolic acid, mercaptoethanol, or the like. Nonoxidizing conditions may also be attained by exclusion of atmospheric oxygen by any of various known means, but use of a mild reducing agent is preferred as it ensures against oxidation by oxidation mechanisms which are indigenous to the reaction mixture including even the enzyme itself. In the case of other protecting or inactivating groups, removal is carried out in conventional manner for restoring the integrity of the type of group required for activity of the enzyme moiety, and according to usual mild reaction conditions, temperatures, and relatively neutral pH's as ordinarily employed in the biochemical art.

The end product of the reaction, then, is again the desired insoluble active enzyme-polymer, but ordinarily in higher yields and conversions to desirably active products, and introduction of desirably high amounts of enzyme activity into the polymer molecule is generally much less difficult using the inactivation, coupling, and reactivation process just discussed. As for the polymer in such reaction, it preferably contains carboxyl or anhydride linkages, especially where the enzyme contains an amino, hydroxyl (including phenolic hydroxyl), or sulhydryl group not essential for its enzymatic activity. Where the enzyme contains a carboxyl group not essential for activity, the polymer can contain free hydroxyl or amine groups for reaction therewith. The polymer is preferably EMA or an EMA-type polymer, but it can be any of those types previously disclosed for coupling reactions with an enzyme, and in any event it is adapted to effect covalent bonding with the enzyme to produce an enzyme-polymer product either directly or using an activating agent.

Purification of Crude-Enzyme Material

As a further aspect of the invention, we have discovered that purification, including removal of undesirable colored impurities, from a crude enzyme or enzyme derivative can be advantageously effected by forming a polymeric derivative directly from the crude enzyme or enzyme derivative, as representatively exemplified by papain and mercuripapain. Preferably the polymeric material contains carboxyl or anhydride linkages, especially where the enzyme contains a free amino, hydroxyl (including phenolic hydroxyl), or sulfhydryl group not essential for its enzymatic activity. Where the enzyme contains a carboxyl group not essential for activity, the polymer can contain free hydroxyl or amine groups for reaction herewith. The polymer is preferably EMA or an EMA-type polymer, but it can be any of those types previously disclosed for coupling reactions with an enzyme and in any event it is adapted to effect covalent bonding with the enzyme to produce an enzyme-polymer product either directly or using an activating agent. The employment of these colored impure (crude) enzyme starting materials for reaction with the polymer in usual aqueous solution or suspension results in selective pickup of the enzyme to the exclusion of impurities and especially pigmented materials, which upon separation remain in the supernatant liquid and can readily be removed and discarded. This is especially true when an insoluble polymer-enzyme product is, as conventional, washed with water and the usual buffer solutions, depending upon the exact polymer-enzyme product being treated and the exact pH conditions therefore desired to be maintained. Since enzymes are produced by cell culture processing, including fermentation production from bacteria and animal cell cultures, or from natural materials by extraction, they frequently contain color bodies as impurities besides toxins, pyrogens, and other undesirable contaminants which are removed only with difficulty. Removal of the purified enzyme from such a colored and impure natural milieux by the procedure here provided not only affords a method of purifying the enzyme, but it provides a polymer-enzyme product, either active or inactive (depending upon the starting enzyme—whether native or inactivated) which is substantially devoid of the undesirable colored impurities present in the starting colored enzyme material. Since these colored impurities are of an unknown nature or derivation, selective pickup of the enzyme by the polymer could not be anticipated. Production of substantially colorless insoluble polymer-enzyme product by reaction of the polymer with the enzyme material (including metal and other enzyme derivatives) having colored impurities in combination therewith, and thereafter aqueously washing the insoluble enzyme-polymer product, is among the objects of the invention. Of course, if the enzyme-polymer material is inactivated, as due to use of an inactivated form of the enzyme as the starting colored enzyme material, the relatively pure inactivated enzyme-polymer product will ultimately have to be reactivated before use.

GENERAL DESCRIPTION OF COVALENT
ATTACHMENT OF ENZYMES TO POLYMERS

Enzymes generally contain a number of functional groups, including amine, carboxyl, hydroxyl, imidazole, sulfhydryl, and disulfide, which are not essential for catalytic activity or substrate binding. Such groups can participate in covalent linkage between the enzyme and a selected carrier polymer. These bonds can include one or several of the following: amides, imides, esters, thioesters and disulfides. These attachments are conducted by procedures adapted to include any requisite protection for the enzyme. This may include a reversible blocking of the enzymatically active sites, as further disclosed herein. Amides are conveniently formed by reacting pendant amino groups of the enzyme with carboxylic anhydride groups on the carrier polymer in water, in aqueous buffer media, or in mixed solvents. Amides, imides and esters are readily formed by activating carboxyl groups of the polymer, or alternatively pendant carboxyls of the enzyme, and reacting them with respective hydroxyl, amine or mercaptan groups on the other reactant. Such activation may be effected by reaction of the carboxyls with various carbodiimides, carbodiimidazoles, Woodward's reagent, etc., to form highly active intermediates capable of reacting with other groups mentioned above under mild conditions, the latter favoring retention of enzymatic activity.

The polymer selected for such reaction can therefore be said to be adapted to couple or react with the enzyme, whether active or enzymatically inactivated, either directly or indirectly through use of an activating agent, as already indicated, and in any event to effect covalent bonding with the enzyme. Since the reactive functional groups of proteins, including enzymes, are frequently hindered, it is sometimes useful to use an organic solvent in combination with water or an aqueous buffer. Such solvent is selected to be compatible with the retention of enzyme activity. It is used in amounts sufficient to partially solvate interacted portions of the molecule and thus increase the ability of the selected functional groups to react, the amount of such solvent usually being less than 50 percent by volume. A particularly useful solvent for such application is dimethylsulfoxide.

POLYMERIC-REACTANT CROSS-LINKING WATER INSOLUBILITY

In its broadest context, the polymer to which the enzyme is to be attached according to one or more aspects of the invention contains carboxyl or anhydride linkages, especially where the enzyme contains an amino, hydroxyl, or sulfhydryl group not essential for its enzymatic activity. Where the enzyme contains a carboxyl group not essential for activity, the polymer can contain hydroxyl or amine groups for reaction herewith. The polymer may be EMA or an EMA-type polymer, or be any of those types previously disclosed for attachment reactions with an enzyme, and in any event it is adapted to couple or react with the enzyme to effect covalent bonding and production of the desired enzyme-polymer product.

Since covalent bonding is desired, it is understood that the carrier polymer is tailored to contain at least one reactive site for each polymer molecule with which the enzyme can react, either directly or indirectly, to produce a covalent bond. According to the instant invention, this reactive site (or sites) is preferably a carboxyl or carboxylic anhydride group.

Among the polymers suitable for the practice of the instant invention, polymeric polyelectrolytes having units of the formula

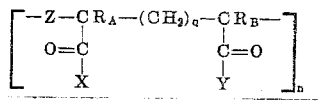

wherein: $R_A$ and $R_B$ are selected from the group consisting of hydrogen, halogen (preferably chlorine), alkyl of one to four carbon atoms (preferably methyl), cyano, phenyl, or mixtures thereof; provided that not more than one of $R_A$ and $R_B$ is phenyl; Z is a bivalent radical (preferably alkylene, phenylalkylene, lower-alkoxyalkylene, and lower-aliphatic acyloxyalkylene) of one to 18 carbon atoms, $q$ is 0 or 1, X and Y are selected from hydroxy, —O alkali metal, OR, $ONH_4$, $—ONHR_3$, $—ONH_2R_2$, $—ONH_3R$, —NRR', and $—(Q)_p—W—(NR'R')_x$, and $—(Q)_p—W—(—OH)_x$, wherein $x$ is 1 to 4 and $p$ is 0 or 1, wherein R is selected from the group consisting of alkyl, phenylalkyl, or phenyl, in each case of one to 18 carbon atoms, wherein R' is H or R, wherein Q is oxygen or —NR'—, and wherein W is a bivalent radical preferably selected from lower-alkylene, phenyl, phenylalkyl, phenylalkylphenyl, and alkylphenylalkyl having up to 20 carbon atoms, X and Y taken together can be an oxygen atom, and at least one of X and Y being hydroxyl or X and Y together constituting an oxygen atom, are preferred. Many of these polymers are commercially available and others are simple derivatives of commercially available products, which can be readily prepared either prior to or simultaneously with the enzyme attachment reaction, or produced as a minor modification of the basic polymer after attachment. Such polymers containing the above-described EMA-type units are hereinafter referred to as an "EMA-type polymer."

Since enzyme molecules commonly have an extremely high molecular weight, even if the polymeric units exemplified as usable for attachment of the enzyme occurs only once in a polymer chain, for example, once in every several hundred units, reaction of the enzyme with this unit will result in an enzyme-polymer product having substantial enzymatic activity and one wherein the enzyme moiety constitutes a substantial portion of the molecular weight of the polymeric enzyme product. If more than one of the exemplified units is present, multiple attachments can be achieved with increased enzymatic activity of the product. As pointed out hereinafter, preferably the units of the formula given are recurring, $n$ being at least 8. When the units are recurring, the symbols in the various recurring units do not necessarily stand for the same thing in all of the recurring units. Moreover, where the units are recurring, some of the X and Y groups may have meanings besides hydroxy or oxygen. For example, some, but not all, of them may be present in the form of imide groups, that is, groups in which X and Y together are —NR— or —N—W—$(NR'R')_x$ wherein R, W and R' have the values previously assigned.

A preferred type of polymeric material useful in the practice of the invention is the polymer of an olefinically unsaturated polycarboxylic acid or derivative with itself or in approximately equimolar proportions with at least one other monomer copolymerizable therewith. The polycarboxylic acid derivative can be of the nonvicinal type, including acrylic acid, acrylic anhydride, methacrylic acid, crotonic acid or their respective derivatives, including partial salts, amides and esters or of the vicinal type, including maleic itaconic, citraconic, α, α-dimethyl maleic, α-butyl maleic, α-phenyl maleic, fumaric, aconitic, α-chloromaleic, α-bromomaleic, α-cyanomaleic acids including their partial salts, amides and esters. Anhydrides of any of the foregoing acids are advantageously employed.

Comonomers suitable for use with the above functional monomers include α-olefins such ethylene, propylene, isobutylene, 1- or 2-butene, 1-hexene, 1-octene, 1-decene, 1-dodecene, 1-octadecene, and other vinyl monomers such as styrene, α-methyl styrene, vinyl toluene, vinyl propionate, vinyl amine, vinyl chloride, vinyl formate, vinyl acetate, vinyl alkyl ethers, e.g., methylvinylether, alkyl acrylates, alkyl methacrylates, acrylamides and alkylacrylamides, or mixtures of these monomers. Reactivity of some functional groups in the copolymers resulting from some of these monomers permits formation of other useful functional groups in the formed copolymer, including hydroxy, lactone, amine and lactam groups.

Any of the said polybasic acid derivatives may be copolymerized with any of the other monomers described above, and any other monomer which forms a copolymer with dibasic acid derivatives. The polybasic acid derivatives can be copolymers with a plurality of comonomers, in which case the total amount of the comonomers will preferably be about equimolar with respect to the polybasic acid derivatives. Although these copolymers can be prepared by direct polymerization of the various monomers, frequently they are more easily prepared by an after-reaction modification of an existing copolymer.

Copolymers of anhydrides and another monomer can be converted to carboxyl-containing copolymers by reaction with water, and to ammonium, alkali and alkaline earth metal and alkylamine salts thereof by reaction with alkali metal compounds, alkaline earth metal compounds, amines, ammonia, either prior to, during, or subsequent to enzyme attachment, etc. Other suitable derivatives of the above polymers include the partial alkyl or other esters and partial amides, alkyl amides, dialkyl amides, phenylalkyl amides or phenyl amides prepared by reacting carboxyl groups on the polymer chain with the selected amines or alkyl or phenylalkyl alcohol as well as amino esters, amino amides, hydroxy amides and hydroxy esters, wherein the functional groups are separated by lower-alkylene, phenyl, phenylalkyl, phenylalkylphenyl, or alkylphenylalkyl, which are prepared in the same manner in each case with due consideration of preservation of enzyme attachment sites as previously stated. Other aryl groups may be present in place of phenyl groups. Particularly useful derivatives are those in which negatively-charged carboxyl groups are partially replaced with amine or amine salt groups. These are formed by reaction of said carboxyls with polyamines such as dimethylaminopropylamine or dialkylaminoalcohols such as dimethylaminoethanol, the former forming an amide linkage with the polymer and the latter an ester linkage. Suitable selection of the above derivatives permit control of several parameters of performance for the enzyme-polymer product of the invention.

Representative dibasic acid or anhydride-olefin polymers, especially maleic acid or anhydride-olefin polymers, of the foregoing type (EMA-type) are known. For example, from U.S. Pat. No. 2,378,629, No. 2,396,785, No. 3,157,595, and No. 3,340,680. Generally, the copolymers are prepared by reacting ethylene or other unsaturated monomer or mixtures thereof, as previously described, with the acid anhydride in the presence of a peroxide catalyst in an aliphatic or aromatic hydrocarbon solvent for the monomers but nonsolvent for the interpolymer formed. Suitable solvents include benzene, toluene, xylene, chlorinated benzene and the like. While benzoyl peroxide is usually the preferred catalyst, other peroxides such as acetyl peroxide, butyryl peroxide, di-tertiary butyl peroxide, lauroyl peroxide and the like, or any of the numerous azo catalysts, are satisfactory since they are soluble in organic solvents. The copolymer preferably contains substantially equimolar quantities of the olefin residue and the anhydride residue. Generally, it will have a degree of polymerization of 8 to 10,000 preferably about 100 to 5,000, and a molecular weight of about 1,000 to 1,000,000 preferably about 10,000 to 500,000. The properties of the polymer, such as molecular weight, for example, are regulated by proper choice of the catalyst and control of one or more of the variables such as ratio of reactants, temperature, and catalyst concentration or the addition or regulating chain transfer agents, such as diisopropyl benzene, propionic acid, alkyl aldehydes, or the like. The product is obtained in solid form and is recovered by filtration, centrifugation or the like. Removal of any residual or adherent solvent can be effected by evaporation using moderate heating. Numerous of these polymers are commercially available. Particularly valuable copolymers are those derived from ethylene and maleic anhydride in approximately equimolar proportions. The produce is commercially available.

The maleic anhydride copolymers thus obtained have repeating anhydride linkages in the molecule, which are readily hydrolyzed by water to yield the acid form of the copolymer, rate of hydrolysis being proportional to temperature. In view of the fact that the reactions of the present invention are carried out in aqueous solutions or suspensions, or using water-solvent mixtures, the product of the covalent bonding of the enzyme to EMA has carboxyl or carboxylate groups attached to its chains adjacent the enzyme instead of anhydride groups, due to hydrolysis of the anhydride groups, which do not react with the enzymes, during the reaction. The same is true of nonreacting anhydride groups present in other polymers, such as EMA-type polymers, which hydrolyze to carboxyl or carboxylate groups during the reaction.

The term "water insoluble," as already stated, when applied means that the product concerned does not dissolve in water or aqueous solutions, even though it may have such characteristics as a high degree of swelling due to solvation by water, even to the extent of existence in a gel form. Water-insoluble products can be separated by methods including filtration, centrifugation, or sedimentation. Such characteristics are imparted by cross-linking.

Thus, water-insoluble products, according to the invention, are produced by reacting the enzyme with a water-insoluble polymer or by causing the reaction product of the enzyme-polymer or inactivated enzyme-polymer to become insoluble either by reaction with a polyfunctional cross-linking agent, such as a polyamine or polyol (including glycol), when this is necessary. The reaction product of the enzyme-polymer or inactivated enzyme-polymer product is often insoluble per se because of interaction between the enzyme moiety and additional polymer chains. If the polymer is precross-linked so as to have a three-dimensional structure or, in some cases, has a sufficiently long linear chain length, the starting polymer is already water insoluble. Other methods of cross-linking exist and are well known in the art. Further detailed description follows.

Insolubilization via cross-linking can be introduced at any of three stages in the preparation of products of this invention:

1. The carrier polymer may be cross-linked prior to attachment of the enzyme by any of several procedures well known in the art of polymer reactions (e.g., incorporation of multifunctional unsaturated monomers during preparation of the polymer or subsequent reaction of the polymer with a few mole percent of multifunctional amines, glycols, etc.).

2. Multifunctional amines, glycols, etc., can be added concurrently with the enzyme in the enzyme-attachment or coupling step.

3. A multifunctional cross-linking agent may be added to the product after the enzyme has been attached. Such cross-linking agents are added in controllable amounts sufficient to insolubilize the product.

Three-dimensional polymers have an infinite molecular weight.

In addition, the enzyme reactant to be attached or coupled to the polymer is commonly multifunctional in itself and thus contributes to the three-dimensional network character of the product. In fact, in many cases, the insolubilization effected in this manner alone is sufficient to impart insoluble characteristics to the product without use of additional cross-linking agents.

When markedly insoluble products are the objective, it is often advantageous to employ copolymers which already contain some cross-linking. Such cross-linked copolymers are known and are obtainable by conducting the polymerization, e.g., the copolymerization of maleic anhydride and hydrocarbon olefin, in the presence of a cross-linking agent, e.g., a compound containing two olefinic double bonds, such as divinylbenzene or vinylcrotonate, poly-1,2-butadiene or alpha, omega-diolefins. The quantity of cross-linking agent will vary with the degree of insolubility desired, but generally will be on the order of from 0.1 to 10 percent by weight of the total monomer mixture.

As one example of procedure for preparation of the three-dimension polymer network, where necessary or desirable, a difunctional compound can be used for cross-linking a preformed dibasic acid/$C_2$-$C_{18}$ monoolefin copolymer. This can be achieved by reaction between the copolymer and a polyamine, e.g., from 0.1 to 10 mole percent of ethylenediamine. Thus, the quantity of cross-linking of the overall polymer can be controlled. It is understood that ethylenediamine is a typical example of a cross-linking reagent, but many other compounds, such as the group of alkylene and other similar polyamines, can be used for this purpose.

DESCRIPTION OF THE PREFERRED EMBODIMENT

The following examples are given by way of illustration only and are not to be construed as limiting.

EXAMPLES 1-5 WATER-INSOLUBLE EMA-PAPAIN DERIVATIVES

A series of EMA derivatives of papain were prepared and their properties investigated (see tables I, II and III).

General Procedure

The general procedure for preparation of the water-insoluble EMA-papain derivatives listed in table I was as follows:

A solution of the desired amount of papain was prepared by the addition of water to a suspension of crystalline papain in 0.05M acetate buffer, pH4.5, until a clear solution was obtained. The papain solution was added with stirring to a homogenized suspension of EMA in 0.1M phosphate at pH 7.6. The cross-linking agent hexamethylenediamine was then added, as indicated. The reaction mixture was left to stand overnight in the cold with magnetic stirring. The insoluble EMA-papain derivatives were separated from the reaction mixture and washed by one of the following two procedures:

a. Centrifugation and washing with 0.1M phosphate buffer pH 7.5 and then with 0.1M NaCl until activity-free supernatants were obtained; followed by several washings with distilled water. The removal of the salt in the last step caused swelling of the EMA-papain gel.

b. Filtration through a sintered glass filter and successive washings, on the filter, with 0.1M phosphate pH 7.5 followed with 0.1M NaCl. Finally the salt was removed by suspending the precipitate in distilled water and centrifugation. Method (b) was used only in cases where relatively dense and flaky precipitates were obtained (nos. 2, 3, and 4 in Table I).

These EMA-papain suspensions could be filtered only when suspended in 0.1M salt (procedure (b)).

When an inactivated metal derivative of the polymer papain products is to be tested, e.g., the mercury derivative of EMA-papain, the product to be tested must have the inactivating metal ion removed either prior to or during the assay by addition of an appropriate chelating agent, preferably in a nonoxidizing media, which prevents oxidation of oxidizable groups, e.g., sulfhydryl groups, of the enzyme. In the foregoing systems, these are provided by the EDTA and cysteine.

Assay (of Enzymatic Activity)

The esterase activity of papain and the EMA-papain derivatives was determined by the pH-stat (using a Radiometer, Copenhagen, Model TTT autotitrator) method at 25° C. (Smith and Parker, J. Biol. Chem. 233, 1387 (1958)). The reaction mixture (5 ml.) was 0.05M in benzoyl-L-arginine ethyl ester (BAEE), 0.005M in cysteine, and 0.002M in ethylenediamine tetraacetate (EDTA). Papain (40–100$\mu$g.) or EMA-papain derivative (possessing similar esterase activity) was added to the reaction mixture and the rate of hydrolysis followed at pH 6.3 in the case of papain, or at pH 8–8.1 in the case of the EMA-papain derivatives. NaOH (0.1M) was used as titrant.

The two crystalline papain preparations used in this study possessed the following esterase activities: commercial 2X crystallized papain, 20$\mu$moles/min./mg. protein; commercial 2X crystallized papain, 14$\mu$moles/min./mg. protein.

The protease activities of papain and the EMA-papain derivatives were determined by the Kunitz casein digestion method. (J. Gen. Physiol. 30, 291 (1947)). The reaction mixture contained 1 ml. of a 1 percent casein solution [in 0.1M tris-(hydroxymethyl amino methane) buffer, pH 7.5], 0.2 ml. EDTA 0.02M. Papain (2–12$\mu$g.) or EMA-papain, possessing similar esterase activity, was added and the casein mixture incubated at 37° for 20 min. The reaction was stopped by the addition of 3 ml. of 5 percent trichloroacetic acid (TCA), and the optical density determined at 280 m$\mu$.

This convenient spectrophotometric method of analysis involves simply determining the optical density (OD) at 280 m$\mu$ of the TCA filtrate (or at 660 m$\mu$ after reaction with Folin's phenol reagent) and comparing this figure with the figure obtained from an assay of an equivalent concentration of a known papain or EMA-papain sample. According to this test, used in table VA, the TCA precipitates all proteins, leaving a supernatant containing peptides and amino acids. Optical density of this supernatant gives the activity of the enzyme material tested—by indicating bondsplitting to form amino acids and peptides from starting test protein (casein). The result may be calculated directly in casein units per gram. See table VA. (One casein unit is the amount of enzyme required to produce TCA-soluble material equivalent to 0.5$\mu$g. of tyrosine at 37° C. in 10 minutes under the conditions of the assay.)

The protease activity of the EMA-papain derivatives was expressed in terms of mg. bound papain, based upon native papain as a standard.

The data on the esterase and protease activities of various EMA-papain derivatives is summarized in tables II and III, respectively.

In the range of carrier to papain ratios studied, the yields of EMA bound papain, as estimated from the esterase activities of the EMA-papain derivatives, were about 50 percent for the "excess carrier" preparations (nos. 1, 2, and 5, table II) and somewhat lower (about 35 percent) for one "excess enzyme" preparation (no. 4, table II). In a preparation in which precross-linked EMA was used (no. 3, table II), about 30 percent of binding was found.

The protease activity of the various EMA-papain derivatives was usually lower by 20–40 percent than the corresponding esterase activity (table III), probably due to both steric and electrostatic effects. It should be noted, however, that in all other insolubilized enzyme systems studied, much lower protease to esterase ratios were found. Therefore, unpredictably high protease activities are attained with these immobilized papain derivatives.

Lyophilization caused a 10 40 percent drop in enzymic activity (see tables II and III).

pH-Activity Profiles

The pH esterase activity profiles of two types of "excess-carrier" EMA-papain derivatives (no. 2, linear-EMA-papain; no. 3, precross-linked-EMA-papain) were investigated (FIG. 1). The acid branch of the pH activity profile of the linear EMA-papain derivative (no. 2) exhibited a shift of about two pH units toward more alkaline pH values (FIG. 1, bottom) at low ionic strength ($\Gamma/2$ or $\Gamma/2$ or I=0.06), as compared to the native enzyme. This shift was only partially reversed at high ionic strength ($\Gamma/2$=1.0).

The cross-linked EMA-papain derivative exhibited a larger pH activity shift in the alkaline direction, about 3 pH units, which was also only partially reversed at $\Gamma/2$=1.0 (FIG. 1, top).

The alkaline limbs of the pH activity curves of both preparations exhibit only small shifts towards more alkaline pH values (FIG. 1). The pH activity profiles of the EMA derivatives of papain were considerably narrower than that of the native enzyme. The narrow pH-optimum of these derivatives is at about pH 8.3 (compared with crystalline papain, which has a broad pH optimum in the range pH 6.0–7.0).

This "digression" from the expected behavior of a polyelectrolyte enzyme derivative cannot be satisfactorily explained.

Stability

The stability of papain at several pH values in the range 3.0 to 9.0 and at three temperatures (37°, 25°, and 0° C.) was investigated (FIG. 2). The results of a parallel experiment carried out with the EMA-papain of example 3, are presented in FIGS. 3 and 4.

Native papain is fairly stable in the pH range 6 to 7 at 0° and neutral pH, no loss of activity was observed after 6 months (FIG. 2). Gradual loss of the activity of the EMA-papain derivatives is observed at acidic pH values (FIGS. 3 and 4). In the neutral and slightly alkaline pH range (pH 6 to 9) however, the EMA-papain derivatives exhibit unusual stability behavior, i.e., an *increase* of esterase activity above its initial value by up to 100 percent. This effect persists even after considerable periods of time. The effect is not presently understood, but could possibly be due to some very slow swelling process taking place in a dilute suspension of the EMA-papain gels.

TABLE I.—PREPARATION OF EMA/PAPAIN DERIVATIVES

| Example | Carrier to enzyme ratio (w/w) | Type of EMA | Degree of crosslinking with HMD [1] (based on weight of carrier) | Papain in reaction mixture | Carrier in reaction mixture | Method of separation and washing of p.p.t.[2] |
|---|---|---|---|---|---|---|
| 1 | 5:1 | Linear EMA [3] | 10 percent | 210 mg.[4] (in 60 ml. water) | 1,050 mg. (in 240 ml. 0.125 M phosph.) | (b) |
| 2 | 5:1 | ....do [3] | 5 percent | do [4] | do | (a) |
| 3 | 5:1 | Precrosslinked EMA [6] | | do [4] | do | (a) |
| 4 | 1:3 | Linear EMA [3] | | 210 mg.[4] (in 40 ml. water) | 70 mg. (in 40 ml. 0.2 M phosph.) | (b) |
| 5 | 5:1 | ....do [3] | 10 percent | 220 mg.[5] | 1,050 mg. (in 100 ml. 0.2 M phosph.) | (b) |

[1] HMD is hexamethylenediamine; EMA is ethylene maleic anhydride copolymer.
[2] See text.
[3] M.W. of about 60,000, D.P. of about 450–500.
[4] Worthington, 2X cryst, papain, having an esterase activity towards BAEE,[7] pH 6.3 of 20 μmoles/min./mg. protein.
[5] Worthington, 2X cryst, papain, having an esterase activity towards BAEE,[7] pH 6.3 of 14 μmoles/min./mg. protein
[6] Precrosslinked EMA is ([3]) crosslinked with vinylcrotonate.
[7] BAEE is benzoyl-L-arginine ethyl ester.

TABLE II.—ESTERASE ACTIVITY OF THE EMA-PAPAIN DERIVATIVES

| No. of prep. | Carrier to enzyme ratio (w/w) | Papain in reaction mixture, mg. | EMA-papain suspension | | EMA-papain, lyophilized powder | | |
|---|---|---|---|---|---|---|---|
| | | | Total esterase activity [1] | Bound esterase in percent of initial activity | Total dry wt., g. | Esterase activity per mg. powder [1] | Total esterase activity |
| 1 | 5:1 | 210 | 99 | 47 | 1.7 | 0.035 | 59 |
| 2 | 5:1 | 210 | 89 | 40 | 1.25 | 0.045 | 56 |
| 3 | [2] 5:1 | 210 | 69 | 33 | 1.5 | 0.041 | 62 |
| 4 | 1:3 | 210 | 71 | 34 | 0.21 | 0.206 | 43 |
| 5 | 5:1 | 220 | 102 | 46 | | | |

[1] The enzymic activities are expressed in terms of the number of mg. of crystalline papain possessing the same esterase activity.
[2] Crosslinked EMA.

TABLE III.—PROTEASE ACTIVITY OF THE EMA-PAPAIN DERIVATIVES

| No. of prep. | Carrier to enzyme ratio (w/w) | Papain in reaction mixture, mg. | EMA-papain, lyophilized powder | | | |
|---|---|---|---|---|---|---|
| | | | Total Dry wt., g. | Protease activity per mg. lyophilized powder [1] | Total protease activity [1] | Bound protease (in percent of initial activity) |
| 1 | 5:1 | 210 | 1.70 | 0.035 | 59.5 | 28.5 |
| 2 | 5:1 | 210 | 1.25 | 0.032 | 40 | 19 |
| 3 | [2] 5:1 | 210 | 1.50 | 0.032 | 48 | 23 |
| 4 | 1:3 | 210 | 0.21 | 0.090 | 19 | 9.5 |
| 5 | 5:1 | 220 | | | [3] 27 | 12 |

[1] The enzymic activities are expressed in terms of the number of mg. of native crystalline papain, possessing the same protease activity.
[2] Crosslinked EMA.
[3] In aqueous suspension. Sample No. 5 was not lyophilized.

Examples 6 and 6A, EMA-Papain

Coupling of crystalline papain to EMA in an aqueous buffer medium using the conventional procedure disclosed for examples 1–5 at high carrier to enzyme ratios (5:1 and 10:1) yielded insoluble derivatives possessing about 30 percent of the initial enzymic activity.

Some loss of activity in the EMA-papains on storage was observed.

Example 7 EMA-Papain

To a Waring blender, 240 ml. of cold 0.2M phosphate buffer pH 7.5 and 1.050 g. of EMA-21 (ethylene-maleic anhydride copolymer, MW 20–30,000; DP ca. 230 repeating units) was added, and the solution homogenized for 1 minute. To the homogenized solution was added 210 mg. of papain dissolved in 60 ml. of the cold phosphate buffer. The solution was then stirred overnight in the cold. The following day the reaction mixture was centrifuged for 10 minutes and the insoluble materials separated and dialyzed against water overnight. The insoluble fractions were then lyophilized. The weight of insoluble EMA-papain was 636.17 mg.

Assay (casein—Kunitz method):

Insoluble EMA/papain:
  2,000 casein units/gram reading
  Optical Density at 660 mμ

Preparation or mercuripapain

Mercuripapain, using commercial 2X crystalline papain as starting material, was prepared by E. Smith's procedure, Kimmel and Smith, J. Biol. Chem. 207, 515 (1954) or by a modification of this procedure. To a solution of papain (23 mg.) in 0.005 cysteine, 0.002M EDTA pH 6.0 (15 ml. preincubated at 37° C. for 15 min., HgCl$_2$ (33 mg.) dissolved in 0.5 Tris pH 8.1 (10 ml.) was added. The reaction mixture was stirred for a few minutes and then exhaustively dialyzed against 0.005M Tris buffer pH 8.0 and then against 0.005M phosphate pH 7.8. The dialyzed solution of Hg-papain was used directly in the binding experiments. The yields of mercuripapain were about 70 percent.

Mercuripapain, using crude papain as starting material, was prepared by slight modification of the above procedure. A crude papain powder (10 gm.) suspension in 0.005M cysteine, 0.002M EDTA, pH 6 (300 ml.) was stirred for 1 hour and the insoluble material filtered off. HgCl$_2$ (900 mg.) dissolved in 0.5M Tris pH 8.1 (40 ml.) was then added to the yellow colored filtrate. Exhaustive dialysis against 0.005M Tris and then 0.005M phosphate was carried out as above. The dialyzed solution of Hg-papain was directly used for binding.

The yields of Hg-papain were usually 60–70 percent of the total activity of the crude powder, but yields as high as 80 percent are attainable by most carefully conducting this procedure.

Zinc-papain is known in the art (See Cayle, U.S. Pat. No. 3,284,316 of Nov. 8, 1966), and may be prepared in the manner of the foregoing preparation and the said patent. Other metal salts which may also be prepared in substantially the same manner and employed as protected or inactivated enzyme agents, in accord with the following examples, are copper, manganese, cobalt, calcium, barium, nickel and like salts of papain, ficin, bromelain, and asclepain, in addition to the mercury and zinc salts of such enzymes.

EXAMPLES 8–15 Insoluble EMA-Mercuripapain Derivatives

Coupling of Hg-papain to EMA polymers

The general procedure employed in the preparation of EMA derivatives of Hg-papain was as follows:

A dimethylsulfoxide (DMSO) solution of dried EMA (55 mg./5 ml.) was added dropwise to an ice-cooled strongly stirred solution of Hg-papain (11.5 mg.) in 0.05M phosphate pH 7.8 (75 ml.) followed by the addition of the appropriate amount of the cross-linking agent-hexamethylene diamine (1 ml. of a 1 percent HMD solution per 100 mg. of EMA). The magnetically stirred solution was left overnight in the cold. The insoluble inactivated Hg-papain/EMA precipitate was spun down (Sorval, SS-3 centrifuge, 12,000 r.p.m., 10–15 min.) and washed several times with water. In most cases the first supernatant was devoid of enzyme activity after mercury removal—indicating efficient binding of Hg-papain to the EMA under these conditions.

In each case, to restore the active sites in the papain moiety, it is necessary either during testing or prior thereto, to remove the mercury with a chelating agent under nonoxidizing conditions such as the mold reducing conditions provided by the presence of cysteine, methyl mercaptan, glutathione, mercaptoethanol, thioglycolic acid, or other sulfhydryl-containing compound.

The insoluble EMA-papain derivatives, prepared in this manner, possessed 56–85 percent of the initial esterase activity.

Lyophilized powders of the various EMA/papain samples, prepared in this manner, retained 70–80 percent of the activity of the materials prior to lyophilization.

Some of the binding data on EMA-papain obtained in this manner using commercial crystalline papain is summarized in table IV. Esterase activity was determined as previously described under "Assay."

EXAMPLES 16–18 EMA-Mercuripapain and EMA-Zinc Papain

EMA/Hg-papain preparations derived from crude papain powder were obtained by essentially the same procedure as given in examples 1–5 and especially 8–15. The dialyzed solution (yellow-brownish in color) of Hg-papain was used directly for coupling with a DMSO solution of EMA, without further concentration or precipitation of the Hg-papain. The insoluble EMA/Hg-papain derivatives obtained were practically devoid of color, especially after the usual washings, most of the colored material remaining in the reaction mixture supernatant.

The same color-elimination results are obtained when using crude papain itself rather than Hg-papain.

Substantially similar results are obtained when using zinc papain to produce the corresponding insoluble EMA/Zn papain derivatives. Moreover, the same purification of color elimination is observed when relatively crude ficin, bromelain, asclepain, lipase, cellulase, or chymopapain, or relatively crude and highly colored Hg or Zn derivatives, are employed for reaction with EMA or an EMA-type polymer, the result in each case being an essentially colorless polymeric product. The purification is most significant when the enzyme is of bacterial origin, as in the case of bacterial lipase or cellulase, and especially in the case of the purification of enzymes produced by *Bacillus subtilis* micro-organisms (see, for example, U.S. Pat. No. 3,031,380).

Data on the products obtained by binding of "crude" Hg-papain to EMA polymers and thereafter removing the mercury is summarized in tables V and VA, assays in table V being as previously indicated under "Assay." The data in table VA is according to the optical density procedure, also previously described. Substantially similar results are obtained with corresponding insoluble EMA/Zn papain derivative.

TABLE IV.—BINDING OF Hg-PAPAIN TO EMA POLYMERS

| | Hg papain in reaction mixture (various preparations) | | Enzyme to carrier ratio | EMA-Hg papain derivatives | | | | |
|---|---|---|---|---|---|---|---|---|
| | | | | Aqueous suspension | | Lyophilized powder | | |
| Example | Mg. | Esterase units [1] | | Total activity esterase units [1] | Percent initial activity | Total activity esterase units [1] | Percent initial activity | Wt., mg. |
| 8 | 2.5 | 42.5 | 1:15 | 23.8 | 56 | 19 | 45 | 17 |
| 9 | 4.7 | 79.9 | 1:10 | 53 | 67 | | | |
| 10 | 11.5 | 285 | 1:5 | 186.2 | 65.3 | | | |
| 11 | 8 | 127 | 1:5 | 99.5 | 73 | | | |
| 12 | 8 | 127 | 1:1 | 108 | 85 | 66 | 52 | 9.4 |
| 13 | 8 | 127 | 3:1 | 99.5 | 73 | | | |
| 14 | 42 | 1,029 | 1:1 | 735.5 | 71.4 | | | |
| 15 | 28.6 | 700 | 1:5 | 499.2 | 71.3 | | | |

[1] After removal of mercury.

TABLE V.—BINDING OF CRUDE Hg-PAPAIN TO EMA POLYMERS

| | | | EMA-Hg papain derivatives | | | | |
|---|---|---|---|---|---|---|---|
| | | | Aqueous suspension | | Lyophilized powder | | |
| Example | Hg-papain in reaction mixture, esterase units [1] | Enzyme to carrier ratio | Total activity [1] esterase units | Percent initial activity | Total activity [1] esterase units | Percent initial activity | Wt., mg. |
| 16 | 10,000 units (500 mg. papain) | 1:1 | 4,320 | 43.2 | 3,124 | 31 | 2,276 |
| 17 | 2,000 units (100 mg. papain) | 1:2 | 1,025 | 51.3 | 705 | 35 | 320 |
| 18 | 7,600 units (380 mg. papain) | 1:5 | 7,890 | 103 | 5,640 | 71.5 | 4,373 |

[1] After removal of mercury.

TABLE VA

| Example | Ratio EMA/papain | Dilution | OD$_{550}$ | Units/g.[1] | OD$_{280}$ | Units/g.[1] |
|---|---|---|---|---|---|---|
| 16 | 1:1 | 10³ | 1.40 | 290,000 | 1.85 | 300,000 |
| 17 | 1:2 | 10³ | 0.24 | 49,000 | 0.24 | 39,000 |
| 18 | 1:5 | 10³ | 0.48 | 98,000 | 0.45 | 73,000 |

[1] Casein units per gram.

Due to the procedure employed in the preparation of Hg-papain from the crude papain powder, the aqueous Hg-papain extract contained considerable amounts of inert protein. Thus, somewhat higher carrier to enzyme ratios are advisable in order to obtain maximum activity from the aqueous extract.

EXAMPLES 19–23 Dimethylaminopropylamine and Aminopropanol Modified EMA/Mercuripapain EMA/Hg-papain derivatives have been converted into polycationic and polyalcohol derivatives through the coupling of excess-carrier EMA/Hg-papain preparations with (a) dimethyl-aminopropylamine (DMAPA; $(CH_3)_2$ N-$(CH_2)_3$-NH$_2$) or (b) 3-aminopropanol respectively, using 1-ethyl-3-(3-dimethylaminopropyl) carbodiimide hydrochloride as the coupling reagent in place of the more usual dicyclohexyl carbodiimide (DCC).

A typical preparation is described below:

An aqueous suspension of EMA/Hg-papain (5:1 carrier to enzyme ratio), corresponding to 100 mg. dry powder ($1.06 \times 10^{-3}$ moles carboxyls; 350 esterase units) was spun down in a centrifuge. The EMA/Hg-papain precipitate was collected and suspended in 16 ml. of (a) 1M DMAPA at pH 6.8 ($16 \times 10^{-3}$ moles) or (b) 16 ml. of 1M propanolamine (pH 6.8). The coupling reagent (1,000 mg.; $5 \times 10^{-3}$ moles) dissolved in water (1.5 ml.) was then added and the reaction mixture left stirring overnight in the cold room. The precipitate was then spun down in a centrifuge and washed until free from the amine reagents. The available data is summarized in table VI.

The polyalcohol derivative of the EMA/Hg-papain, i.e., the product of the coupling, in the manner of examples 19–23, of EMA/Hg-papain with propanolamine, upon mercury removal, displays the broad pH activity profile characteristic of the native enzyme (pH optimum in the range pH 6–6.8).

In the same manner, starting from the appropriate dialkylaminoalkylamine or aminoalkanol, additional dialkylaminoalkylamine and aminoalkanol derivatives are prepared, for example, the diethylaminobutyl or dibutylaminooctyl EMA/Mercuripapain., zinc papain, and the corresponding reactivated EMA/papain (or EMA-ficin, EMA-chymopapain, EMA-asclepain, or EMA-bromelain) product, as well as the aminoethanol or aminooctanol EMA/mercuri or EMA/zinc papain (or EMA-ficin, EMA-chymopapain, EMA-asclepain, or EMA-bromelain) and the corresponding reactivated EMA/papain (or EMA-ficin, EMA-chymopapain, EMA-asclepain, or EMA-bromelain product).

EXAMPLE 24 Propylamine Modified EMA/Mercuripapain

In an experiment on the coupling of propylamine to EMA/Hg-papain in the manner of example 19, a precipitate exhibiting relatively low enzymatic activity (19 percent of the initial activity), upon removal of the mercury, was obtained.

In the same manner, coupling of different lower-alkylamines produces different lower-alkyl-amine modified EMA/papain (or EMA-ficin, EMA-chymopapain, EMA-asclepain, or EMA-bromelain) polymers, for example, the butylamine EMA/Hg or Zn papain (or EMA-ficin, EMA-chymopapain, EMA-asclepain, or EMA-bromelain) and the corresponding reactivated butylamine EMA/papain (or EMA-ficin, EMA-chymopapain, EMA-asclepain, or EMA-bromelain) product and octylamine EMA/Hg or Zn papain (or EMA-ficin, EMA-chymopapain, EMA-asclepain, or EMA-bromelain) and the corresponding reactivated octylamine EMA/papain (or EMA-ficin, EMA-chymopapain, EMA-asclepain, or EMA-bromelain product).

The polycationic EMA/Hg-papain derivatives (obtained by the coupling of EMA/papain with dimethylaminopropylamine, DMPA), in the manner of examples 19–23, display a broad pH activity profile essentially identical with that of crystalline papain (pH optimum in the range pH 6–7). Thus the displacement of the pH activity profile toward more acidic pH values predicted from the electrostatic model previously employed (Goldstein, Levin and Katchalski (1964), Biochemistry 3, 1913) is not observed in the case of the polycationic papain derivatives.

The neutral polyalcohol derivative (aminopropanol-modified EMA-papain) of example 23, after activation, shows a pH stability behavior similar to that of crystalline papain, that is, inactivation at a pH of about 3, but with slightly broader plateaus.

The polycationic (dimethylaminopropylamine-modified EMA-papain) of examples 20 and 22, after activation, exhibits a displacement of the pH-stability curve toward more acid ranges, that is, inactivation takes place at a pH of about 2.

TABLE VI.—MODIFIED EMA/Hg-PAPAIN DERIVATIVES

| | | | | | Modified EMA/Hg-Papain Derivatives [1] | | | | |
|---|---|---|---|---|---|---|---|---|---|
| | | | | | Aqueous Suspension | | Lyophilized Powder | | |
| Example | Enzyme to carrier ratio | Total activity esterase units [1] | Approx. weight, mg. | Modifier | Total activity esterase units [1] | Percent initial activity | Total activity esterase units [1] | Percent initial activity | Wt., mg. |
| 19 | 1:10 | 42.6 | 79 | DMAPA [2] 1M, pH 7.65 | 20 | 48 | | | |
| 20 | 1:5 | 171 | 85 | DMAPA 1M, pH 7.65 | 116 | 68 | 42 | 24.6 | |
| 21 | 1:1 | 350 | 50 | DMAPA 1M, pH 6.85 | 175 | 50 | 60 | 20 | 37 |
| 22 | 1:5 | 350 | 170 | DMAPA 2M, pH 6.85 | 115 | 33 | 75.5 | 21.6 | 195 |
| 23 | 1:5 | 33 | 20 | Amino propanol 1M, pH 7.7 | 33.6 | 100 | | | |
| 24 | 1:5 | 33 | 20 | Propylamino 1M, pH 7.65 | 6.24 | 16 | | | |

[1] After removal of mercury.  [2] Dimethylaminopropylamine.

EXAMPLE 25 EMA-Mercurificin and EMA-Ficin

Ten (10) g. of crude ficin extract is suspended in 200 ml. of distilled water. Insoluble impurities are removed by centrifugation. 100 mg. of mercuric chloride is added and the mixture stirred for 30 minutes. The protein is precipitated by the addition of cold acetone (2 volumes) and the solid collected by centrifugation and redissolved in 20 ml. of 0.01M Tris buffer pH 8.0.

The general procedure of examples 8–15 for the preparation of EMA-Hg papain is employed for coupling of the mercurificin to EMA polymers, with mercurificin being substituted for the mercuripapain.

After activation of the polymeric product by removal of mercury using EDTA and mercaptoethanol, the EMA-ficin product is found to possess 75–90 percent of the original enzymatic activity.

EXAMPLE 26 EMA-Mercuribromelain and EMA-Bromelain

One (1) g. of bromelain (food grade) is suspended in 200 ml. of water and 50 mg. of HgCl$_2$ in 10 ml. water is added thereto. After stirring the solution for 30 minutes, it is dialyzed at 5° overnight against 16 liters of 0.01M Tris buffer pH 7.5 and the dialyzed solution used directly to prepare the EMA derivative according to the procedure of examples 8–15 with the mercuribromelain being substituted for the mercuripapain of those examples. After activation by removal of the mercury using EDTA and mercaptoethanol, the EMA-bromelain product is worked up in the usual manner and found to possess 75–90 percent of the initial enzymatic activity.

EXAMPLE 27 Reactivation of EMA-Enzyme Derivatives

The general procedure employs any of the polymer-metal enzyme derivatives described in any of the foregoing examples.

Procedure A

To a solution of 0.005M cysteine, 0.002M EDTA, pH 6 (500 ml.) is added, wkth stirring, an EMA/Hg-papain derivative (prepared in example 8) (5 g.) and the mixture is stirred for 1 hour at room temperature. At the end of this time the mixture is dialyzed against an aqueous solution of cysteine and EDTA followed by a second exhaustive dialysis against an aqueous solution of cysteine at room temperature, and the mixture is then lyophilized to yield EMA/papain (4.5 g.) which is free from mercury ion. The insoluble EMA-papain derivative, prepared in this manner, possesses 65–85 percent of the initial esterase activity.

Procedure B

As in procedure A, the EMA-Hg papain derivative is treated with the dilute cysteine/EDTA solution. This solution is then directly lyophilized without prior dialysis to yield the active EMA-papain product.

EXAMPLE 28 EMA-Zn Papain and EMA-Papain

Preparation of zinc papain

To a solution of crude papain (55 mg.) in 0.005M cysteine, pH 6.0 (30 ml.) is added, with stirring, a solution of zinc chloride (50 mg.) dissolved in 0.2M Tris buffer, pH 7.8 (30 ml.). After stirring, the solution is exhaustively dialyzed against 0.01M Tris buffer and this solution is used directly for attachment to EMA.

Coupling of Zn-papain to EMA polymer

The general procedure employed in the preparation of EMA derivatives of Zn-papain is the same as described in examples 8–15 for preparation of EMA derivatives of Hg-papain with the exception that Zn-papain is substituted for the Hg-papain. Product yields are in the range of 90–95 percent.

After activation by removal of the zinc (by treatment with a solution of cysteine and EDTA according to procedure as described in example 27, procedures A and B), the EMA-papain derivative is found to possess 85–90 percent of the initial activity. Without prior removal of the zinc ion, the EMA/Zn-papain product has a proteolytic activity of only 15–20 percent of the initial activity.

EXAMPLE 29 EMA-Papain Using Organically Stabilized Papain

EMA-papain is prepared with preliminary protection of the sulfhydryl groups of papain by conversion of these groups to disulfide groups and subsequent reaction of the thus-inactivated papain with EMA according to the procedure of examples 1–5. The insoluble EMA-protected papain product is isolated by filtration or centrifugation and washed with water and thereafter reactivated by treatment in a nitrogen atmosphere with a 1M solution of mercaptoethanol at a pH between 4 and 6. The reactivated product contains a substantial amount, about 75 percent, of the initial enzyme activity.

Conversion of the sulfhydryl groups of papain to disulfide linkages is accomplished by reacting the papain with a 2M cysteine solution at a pH between about 6 and 9 under mildly oxidative conditions which may be maintained by bubbling air through the stirred reaction mixture. The product thus produced is a papain-cystine derivative, which may be used directly in the coupling process without isolation or further purification. Alternatively, excess cysteine may be removed from the reaction mixture prior to coupling by physical means, as by dialysis.

EXAMPLE 30 Papain-Styrene Maleic Anhydride Copolymers

Coupling of crystalline papain to an alternating styrene-maleic anhydride (1:1) copolymer, in aqueous buffer medium using the conventional procedure of examples 1–5 at carrier to enzyme ratios of 1:3 to 5:1, yields insoluble polymer-papain derivatives having up to about 20 percent of the original enzymic activity.

Employment of mercrui or zinc papain, according to the procedure of examples 8–15, produces the same result with somewhat greater facility and a somewhat higher percentage of initial enzymatic activity in the polymer-papain product.

When relatively crude papain or mercuri or zinc papain is employed, the product after the usual washing with water and aqueous buffer solutions, is characterized by substantial absence of the color originally present in the crude enzyme starting material, in accord with the phenomenon already observed and reported in examples 16–18.

EXAMPLE 31 Papain-Vinyl Methyl Ether/Maleic Anhydride Copolymers

Coupling of crystalline papain to an alternating vinyl methyl ether/maleic anhydride (1:1) copolymer, in aqueous buffer medium using the conventional procedure of examples 1–5 at carrier to enzyme ratios of 1:3 to 5:1, yields insoluble polymer-papain derivatives having up to about 50 percent of the original enzymic activity.

Employment of mercuri or zinc papain, according to the procedure of examples 8–15 produces the same result with somewhat greater facility and a somewhat higher percentage of initial enzymatic activity in the polymer-papain product.

When relatively crude papain or mercuri or zinc papain is employed, the product after the usual washing with water and aqueous buffer solutions is characterized by substantial absence of the color originally present in the crude enzyme starting material, in accord with the phenomenon already observed and reported in examples 16–18.

EXAMPLE 32 Papain-Vinyl Acetate/Maleic Anhydride Copolymers

Coupling of crystalline papain to an alternating vinyl acetate-maleic anhydride (1:1)copolymer, in aqueous buffer medium using the conventional procedure of examples 1–5 at carrier to enzyme ratios of 1:3 to 5:1, yields insoluble polymer-papain derivatives having up to about 60 percent of the original enzymic activity.

Employment of mercuri or zinc papain, according to the procedure of examples 8–15 produces the same result with somewhat greater facility and a somewhat higher percentage of initial enzymatic activity in the polymer-papain product.

When relatively crude papain or mercuri or zinc papain is employed, the product after the usual washing with water and aqueous buffer solutions, is characterized by substantial absence of the color originally present in the crude enzyme starting material, in accord with the phenomenon already observed and reported in examples 16–18.

EXAMPLE 33 Papain-Divinyl Ether/Maleic Anhydride Cyclocopolymers

Coupling of crystalline papain to an alternating divinyl ether-maleic anhydride cyclocopolymer (having repeating units consisting of adjacent ethylene-maleic anhydride segments which are additionally bonded to each other by an ether linkage), in aqueous buffer medium using the conventional procedure of examples 1–5 at carrier to enzyme ratios of 1:3 to 5:1, yields insoluble polymer-papain derivatives having up to about 50 percent of the original enzymic activity.

Employment of mercuri or zinc papain, according to the procedure of examples 8–15, produces the same result with somewhat greater facility and a somewhat higher percentage of initial enzymatic activity in the polymer-papain product.

When relatively crude papain or mercuri or zinc papain is employed, the product after the usual washing with water and aqueous buffer solutions, is characterized by substantial absence of the color originally present in the crude enzyme starting material, in accord with the phenomenon already observed and reported in examples 16–18.

EXAMPLE 34 Papain-Polymaleic Anhydride Polymers

Coupling of crystalline papain to a polymaleic anhydride polymer, in aqueous buffer medium using the conventional procedure of examples 1–5 at carrier to enzyme ratios of 1:3 to 5:1, yields insoluble polymer-papain derivatives having up to about 70 percent of the original enzymic activity.

Employment of mercuri or zinc papain, according to the procedure of examples 8–15, produces the same result with somewhat greater facility and a somewhat higher percentage of initial enzymatic activity in the polymer-papain product.

When relative crude papain or mercuri or zinc papain is employed, the product after the usual washing with water and aqueous buffer solutions, is characterized by substantial absence of the color originally present in the crude enzyme starting material, in accord with the phenomenon already observed and reported in examples 16–18.

EXAMPLE 35 Papain-Polyacrylic Anhydride Polymers

Coupling of crystalline papain to a polyacrylic anhydride polymer, in aqueous buffer medium using the conventional procedure of examples 1–5 at carrier to enzyme ratios of 1:3 to 5:1, yields insoluble polymer-papain derivatives having up to about 50 percent of the original enzymic activity.

Employment of mercuri or zinc papain, according to the procedure of examples 8–15, produces the same result with somewhat greater facility and a somewhat higher percentage of initial enzymatic activity in the polymer-papain product.

When relatively crude papain or mercuri or zinc papain is employed, the product after the usual washing with water and aqueous buffer solutions, is characterized by substantial absence of the color originally present in the crude enzyme starting material, in accord with the phenomenon already observed and reported in examples 16–18.

It is to be understood that the invention is not to be limited to the exact details of operation or exact compounds, compositions, or procedures shown and described, as obvious modifications and equivalents will be apparent to one skilled in the art, and the invention is therefore to be limited only by the full scope of the appended claims, including the application of the doctrine of equivalents thereto.

We claim:

1. The method of purifying and decoloring a crude enzyme material containing undesirable colored impurities normally present in said crude enzyme as produced by fermentation or extraction of natural materials, to remove impurities including undesirable colored impurities and produce a polymer-enzyme product of improved purity and coloration, said method comprising the step of coupling or reacting the said crude enzyme material with a polymer, adapted to effect covalent bonding with the enzyme in said crude material, to produce a substantially colorless, water insoluble, enzyme-polymer product and separating the said enzyme-polymer product, wherein the starting polymer contains a carboxylic anhydride or activated carboxyl group.

2. The process of claim 1, wherein the polymer is an EMA-type polymer.

3. The process of claim 1, which comprises the step of aqueously washing the product.

4. The process of claim 1, wherein the enzyme material comprises an enzyme having a sulfhydryl group or a metal derivative thereof and the polymer is an EMA-type polymer.

5. The process of claim 1, wherein the starting enzyme material and the polymeric enzyme product are both at least partially inactivated and the polymeric enzyme product is subsequently reactivated.

6. The process of claim 1, wherein the enzyme material comprises a bivalent metal derivative of papain and the polymer is EMA.

7. The process of claim 1, wherein the enzyme material comprises papain and the polymer is EMA.

8. The process of claim 1, wherein the enzyme material comprises mercuripapain or zinc papain and the polymer is EMA.

9. The process of claim 1, wherein the enzyme is selected from the group consisting of papain, chymopapain, ficin, bromelain, asclepain, cellulase, lipase, protease, and enzyme mixtures produced by *Bacillus subtilis* micro-organisms.

* * * * *

UNITED STATES PATENT OFFICE
CERTIFICATE OF CORRECTION

Patent No. 3,627,640     Dated December 14, 1971

Inventor(s) Shmaryahu Blumberg et al.

It is certified that error appears in the above-identified patent and that said Letters Patent are hereby corrected as shown below:

| | |
|---|---|
| Col. 1, line 19<br>Page 1, line 15 | "25"<br>-- as -- |
| Col. 1, line 61<br>Page 2, line 24 | "operation"<br>-- operations -- |
| Col. 2, line 17<br>Page 3, line 22 | "resorting"<br>-- restoring -- |
| Col. 7, line 74<br>Page 16, line 9 | "p is o or 1"<br>-- p is zero or 1 -- |
| Col. 9, line 54<br>Page 20, line 1 | "addition or"<br>-- addition of -- |
| Col. 9, line 62<br>Page 20, line 9 | "produce"<br>-- product -- |
| Col. 11, line 50<br>Page 24, line 12 | "benzoyl-Larginine"<br>-- benzoyl-L-arginine -- |
| Col. 12, line 33<br>Page 26, line 5 | "10 40"<br>-- 10 to 40 -- |
| Col. 12, line 42<br>Page 26, line 14 | "$\Gamma/2$ or $\Gamma/2$"<br>-- $\Gamma/r$ or $\frac{gamma}{2}$ -- |
| Col. 14, line 63<br>Page 31, line 15 | "(15 ml"<br>-- (15 ml) -- |
| Col. 15, line 39<br>Page 32, line 29 | "mold"<br>-- mild -- |

UNITED STATES PATENT OFFICE
CERTIFICATE OF CORRECTION

Patent No. 3,627,640          Dated    December 14, 1971

Inventor(s)   Shmaryahu Blumberg et al.

It is certified that error appears in the above-identified patent and that said Letters Patent are hereby corrected as shown below:

Col. 20, line 5            "mercrui"
Page 44, line 31          -- mercuri --

Col. 21, line 7            "relative"
Page 47, line 8           "relative"
                                   -- relatively --

Signed and sealed this 4th day of July 1972.

(SEAL)
Attest:

EDWARD M. FLETCHER, JR.      ROBERT GOTTSCHALK
Attesting Officer              Commissioner of Patents